Patented Nov. 24, 1936

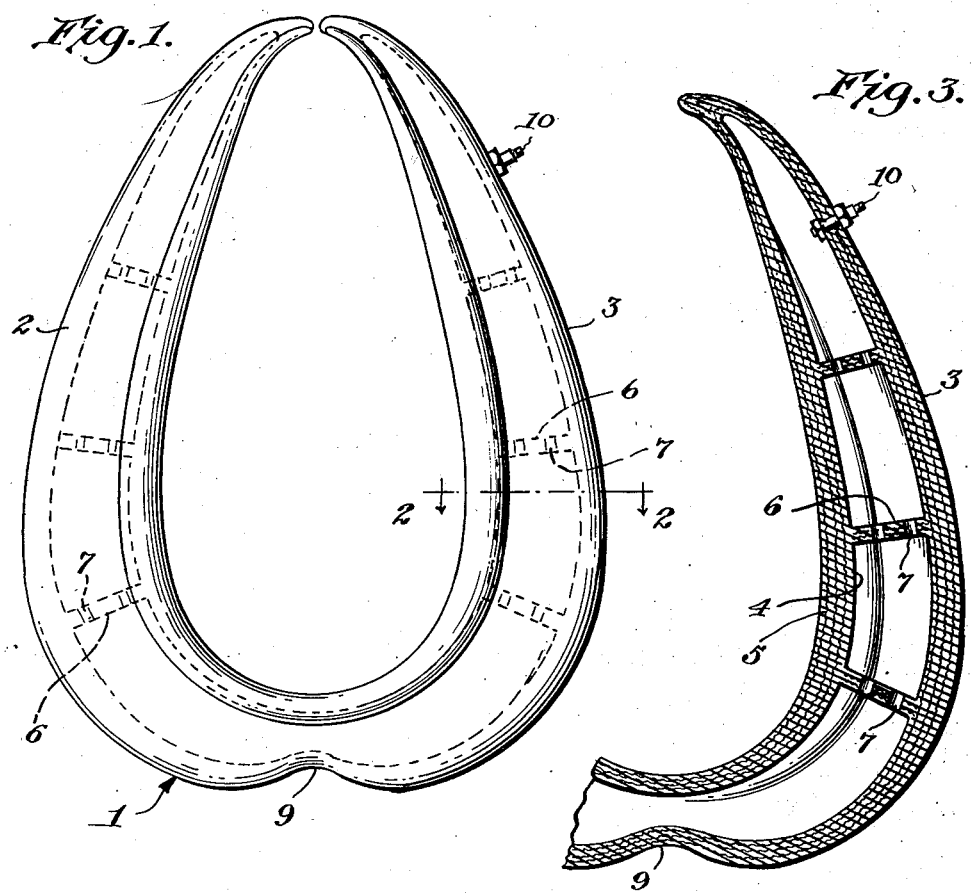

2,062,063

UNITED STATES PATENT OFFICE 2,062,063

PNEUMATIC HORSE COLLAR

Harry Clay Kirby, Sunbury, Ohio

Application October 11, 1935, Serial No. 44,606

2 Claims. (Cl. 54—19)

This invention relates to horse collars and has for its primary object to provide a collar of the inflatable type which is strong and durable in construction.

Another object of the invention consists in the provision of a horse collar in which only a low pressure of air is required.

A further object of the invention resides in providing a pneumatic horse collar having certain reinforcements whereby the collar will not collapse even though uninflated.

A further object of the invention consists in providing a pneumatic horse collar provided with perforated partitions which serve to reinforce the collar and to control the flow of air from one point to another in the collar as pressure on the latter varies.

Other objects and advantages of the invention will be apparent from the following description when taken in connection with the accompanying drawing, in which, Figure 1 is a front elevational view of the complete collar.

Figure 2 is a transverse sectional view taken on line 2—2 of Figure 1.

Figure 3 is a fragmentary sectional view through the collar, and

Figure 4 is a perspective view of one of the perforated partitions.

Referring to the drawing in more detail the numeral 1 indicates the collar generally. The shape of the collar is of substantially conventional design comprising the two tapered legs 2 and 3 integrally connected at their lower ends.

Rubber and fabric are employed in the construction of the collar and it is built up in a manner quite similar to the pneumatic tires in common use except that an inner tube is not necessary. The rubber is indicated by the numeral 4 and the fabric by numeral 5.

The partitions 6, provided with apertures 7 of the desired number, are separately built up of rubber and fabric as indicated in Figures 3 and 4 and these partitions, are preferably mounted on the interior of two semi-circular sections of rubber tubing and the whole vulcanized prior to the building up of the rubber and fabric body. The partitions are mounted only in those portions of the collar which receive the greatest pressure from the horse's shoulders, that is, the portions of the legs intermediate their ends.

As will be apparent from an inspection of Figure 2, the walls of the collar are thickened at the point 8 where the greatest pressure is applied to the collar and thus not only reinforce the collar but also stiffen it so that only a moderate air pressure is necessary to maintain the collar inflated. This reinforcement is supplemented by the partitions 6, which also serve to maintain the collar in shape when the air pressure is omitted. That portion of the collar joining the two legs 2 and 3 is preferably provided with an indentation or inward curve 9 to facilitate opening of the collar when being applied or removed.

In order that the desired air pressure may be injected into the collar, a conventional type of air valve 10 is provided as indicated in Figures 1 and 3.

The collar is mounted on the horse in the usual way with the hames on the front side thereof, the collar being provided with only a moderate internal air pressure.

When in use the pressure from the horse's shoulder is intermittently and alternately applied to the legs 2 and 3 of the collar at the thickened portion 8. This intermittent pressure is in the nature of a pumping action and causes the air to flow toward and away from the point 8 and the flow is moderated by the apertured partitions 6. Moreover, the partitions and the thickened wall of the collar stiffen the latter to the extent that only a relatively small fluid pressure is required in the collar. By reason of the low pressures required in the collar there can be no excessive internal pressures produced when the collar is squeezed between the hames and the shoulder of the horse and hence undue wear or rupture of the collar from this cause is eliminated. Furthermore, it should be noted that by reason of the built-up construction of the collar it may be readily repaired and revulcanized when impaired by long use just as an automobile tire may be repaired.

From the foregoing description taken in connection with the accompanying drawing it will be apparent that I have devised a semi-pneumatic horse collar of strong and durable construction; that only relatively low air pressure is required to provide the desired cushioning effects thereby eliminating the creation of destructive pressures in the top and bottom of the collar when in use; that the flow of fluid pressure within the collar is automatically controlled and moderated; and that the collar is susceptible of easy repair after it has become worn.

In accordance with the patent statutes I have described the preferred embodiment of the invention, but it will be obvious that various minor changes may be made in the details of construction and all such changes are intended to be included within the scope of the appended claims.

What is claimed is:

1. A pneumatic horse collar including a hollow body built up of fabric and rubber, and transverse, perforated partitions mounted in the body.

2. A pneumatic horse collar including a hollow body built up of fabric and rubber, a portion of the body being provided with thickened walls intermediate the upper and lower ends of the collar, and transverse, perforated partitions mounted in the body.

HARRY CLAY KIRBY.